United States Patent
Xu et al.

(10) Patent No.: US 11,212,012 B2
(45) Date of Patent: Dec. 28, 2021

(54) METHOD AND DEVICE FOR SYNCHRONIZING HIGH-SPEED QUANTUM KEY GENERATION SYSTEM

(71) Applicant: Beijing Zhongchuangwei Quantum Communication Technological Company, Ltd., Beijing (CN)

(72) Inventors: Xiufeng Xu, Jiangsu (CN); Zhen Li, Jiangsu (CN); Peng Liu, Jiangsu (CN)

(73) Assignee: Beijing Zhongchuangwei Quantum Communication Technological Company, Ltd., Beijing (CN)

( * ) Notice: Subject to any disclaimer, the term of this patent is extended or adjusted under 35 U.S.C. 154(b) by 0 days.

(21) Appl. No.: 17/257,668

(22) PCT Filed: Dec. 5, 2019

(86) PCT No.: PCT/CN2019/123165
§ 371 (c)(1),
(2) Date: Jan. 4, 2021

(87) PCT Pub. No.: WO2020/134934
PCT Pub. Date: Jul. 2, 2020

(65) Prior Publication Data
US 2021/0250102 A1    Aug. 12, 2021

(30) Foreign Application Priority Data
Dec. 28, 2018    (CN) .......................... 201811618289.8

(51) Int. Cl.
*H04B 10/70*    (2013.01)
(52) U.S. Cl.
CPC .................................... *H04B 10/70* (2013.01)
(58) Field of Classification Search
CPC .. H04B 10/70; H04L 9/00; H04L 9/08; H04L 9/12
(Continued)

(56) References Cited

U.S. PATENT DOCUMENTS 10,187,205 B2 *   1/2019   Guinnard ............... H04B 10/70
10,574,450 B2 *   2/2020   Lucamarini ........... H04B 10/85
(Continued)

FOREIGN PATENT DOCUMENTS

CN    103546280 A    1/2014
CN    105490752 A    4/2016
(Continued)

OTHER PUBLICATIONS

Liu et al; Secure and efficient synchronization scheme for quantum key distribution; Oct. 2019; optical society of America; pp. 1-8. (Year: 2019).*

*Primary Examiner* — Amritbir K Sandhu
(74) *Attorney, Agent, or Firm* — Bret E. Field; Bozicevic, Field & Francis LLP

(57) ABSTRACT

The present application provides a method and a device for synchronizing a high-speed quantum key generation system, wherein the method comprises: a sender aligns first light pulse of signal light with that of synchronization light, and controls the signal light not to emit light during N consecutive periods within each period $T_t$ of the synchronization light; a receiver performs time measurement on received signal light pulse, the signal light emits light at the remaining corresponding positions except the N consecutive non-emitting positions in each period $T_t$, the emitting positions can join the statistical process of $T_{1i}$ and $T_{2i}$, the statistical time is reduced by several orders of magnitude relative to the existing method of only sending single signal light pulse, and the statistical process can be completed in a few hundred milliseconds or even shorter. Therefore, the method of the present application has the features of low hardware processor consumption and short statistical time, can obviously improve the time consumption required in the system syn- (Continued)

chronization process and reduce the time required for establishing links of a communication system.

5 Claims, 4 Drawing Sheets

(58) Field of Classification Search
USPC .................................................. 398/140–172
See application file for complete search history.

(56) References Cited

U.S. PATENT DOCUMENTS

| | | | | |
|---|---|---|---|---|
| 2003/0231771 | A1* | 12/2003 | Gisin | H04L 9/0852 380/255 |
| 2007/0133799 | A1* | 6/2007 | Vig | H04B 10/70 380/256 |
| 2010/0002881 | A1* | 1/2010 | Youn | H04B 10/70 380/256 |
| 2011/0317836 | A1* | 12/2011 | Yeh | H04L 9/12 380/256 |
| 2012/0294625 | A1* | 11/2012 | Dynes | H04L 9/0852 398/155 |
| 2020/0274702 | A1* | 8/2020 | Shterman | H04B 10/70 |
| 2020/0304300 | A1* | 9/2020 | Rhee | H04L 9/0858 |

FOREIGN PATENT DOCUMENTS

| | | | |
|---|---|---|---|
| CN | 206135937 U | * | 4/2017 |
| CN | 108075886 A | * | 5/2018 |

* cited by examiner

METHOD AND DEVICE FOR SYNCHRONIZING HIGH-SPEED QUANTUM KEY GENERATION SYSTEM

FIELD OF THE PRESENT DISCLOSURE

The invention relates to the field of quantum communication, in particular to a method and a device for synchronizing a high-speed quantum key generation system.

BACKGROUND OF THE PRESENT DISCLOSURE

In a quantum communication system, the communication parties use a synchronization signal as a time reference to achieve signal synchronization. A synchronization light typically employs light of a low repetition rate, and a signal light typically employs light of a high repetition rate, and there is typically a fixed number of signal pulses of the signal light between two adjacent signal pulses of the synchronization light. A sender aligns the first signal pulse of the synchronization light with that of the signal light, and transmits the synchronization light and the signal light to a receiver with the same optical fiber. Because of the optical fiber length, equipment diversity, optical fiber dispersion and other reasons in a communication system, a time difference between the synchronization light and the signal light reaching a processing unit of the receiver cannot be determined. The delay difference needs to be measured through a calibration process, and the signal light is processed by using the measured delay difference in the subsequent processing process so that the synchronization process of the two communication parties is completed.

The existing synchronization process is schematically shown in FIG. 1 and FIG. 2, and comprises the steps as follows: (1) the sender aligns the first signal pulse of the signal light with the first signal pulse of the synchronization light, and the signal light does not emit light between two adjacent signal pulses of the synchronization light, wherein the pulse signal form of the signal light is a signal light schematic view shown by the solid line in FIG. 1; (2) only one signal pulse of the signal light can be received by the receiver in each period of the synchronization light, the arrival time of the signal pulse is counted to obtain a final delay difference $T_0$, and finally, time correction on the signal light pulse is performed by using $T_0$ to complete the synchronization function of the two communication parties.

However, since a detector in the quantum key generation system is a gated detector in the actual synchronization process, the optimal detection efficiency of the gated detector can be ensured only if a gate opening time of the gated detector and the photon arrival time are precisely synchronized. For example, the gate opening time of the gated detector is 1-2 ns, and the pulse width of the signal light is approximately 500 ps; so that when the synchronization error is large, the pulse width of the detected signal light exceeds the gate opening time of the gated detector, and the pulse of the signal light is not detected so that the detection error is large. In addition, the quantum key generation system further comprises a time filtering window, wherein the window is used for filtering through a time dimension. The width of the time filtering window is generally about 1 ns, and if the pulse width of the detected signal light exceeds the width of the time filtering window when the synchronization error is large, the signal light herein is considered to be a noise wave and is discarded. Therefore, for accurate synchronization, a statistical error less than 1% is required. The statistical error is calculated by $1/\sqrt{n}$, so statistics on at least 10,000 effective values are required to be performed.

However, the existing scheme requires a long time since the statistical error needs to be controlled within 1% in the process of completing the statistics of the arrival time of the signal light. This is because the existing scheme outputs only one signal pulse of the signal light within each signal pulse period of the synchronization light, which means that the signal pulse light-emitting repetition frequency of the signal light is only on the order of magnitude of $10^5$ per second. The attenuation of the signal light in the system is usually more than 30 dB due to the signal light outlet light intensity in a quantum communication system being usually at a single photon level, and the attenuation of a transmission link, and the detection efficiency and the like. That is, only a single photon less than one thousandth is detected by the receiver, making the receiver detect less than 100 effective values per second and requiring at least 100 seconds to count up to 10,000 effective values. Therefore, the synchronization calibration process takes too long, which will cause a too long initialization time of the communication system and a too long time required for establishing a link of a communication system.

In addition, the period of the signal light is $T_x$, the period of the synchronization light is $T_t=1000T_x$, the period $T_t$ of the synchronization light is generally in the order of magnitude of 10 us, and the measurement time accuracy is generally within 100 ps, which means that the statistical interval required by the existing scheme is in the order of magnitude of $10^5 \sim 10^6$, namely the system needs to process $10^5 \sim 10^6$ $T_t$ pulse signals of the synchronization light and pulse signals of the signal light. The required buffering is at least $10^6 \times 16$ bit, i.e. at least 16 Mbit, which is undoubtedly an intolerable resource consumption for a hardware processor.

SUMMARY OF THE PRESENT DISCLOSURE

The invention provides a method and a device for synchronizing high-speed quantum key generation system, and aims to solve the problems that the existing quantum key generation system synchronization method causes too long system synchronization time and too long time required for communication system establishing a link.

A method for synchronizing a high-speed quantum key generation system is disclosed, comprising:

a sender:

controlling a first light pulse of a signal light to align with a first light pulse of a synchronization light, and controlling the signal light not to emit light in N consecutive periods within each period $T_t$ of the synchronization light, where $N \geq 1$ and N is a positive integer;

a receiver:

taking a time each time the light pulse of the synchronization light is received as a starting time, performing time measurement on the received light pulse of the signal light, and storing all measurement results in $T_{di}$;

calculating $T_{di}/T_x$, wherein the integer for $T_{di}/T_x$ is denoted as $T_{1i}$, and the remainder for $T_{di}/T_x$ is denoted as $T_{2i}$;

performing time distribution statistics on $T_{2i}$, and selecting a group of corresponding times with the most time-distribution as $T_4$;

performing numerical value distribution statistics on $T_{1i}$, and finding out a position where the signal light does not emit light within N periods to obtain an integer number $T_3$ of $T_x$ contained between the first light pulse of the signal light and the light pulse of the synchronization light; and calculating a delay difference $T_0=T_3 \times T_x + T_4$, and realizing synchronization.

Preferably, performing time distribution statistics on $T_{2i}$ comprises:

dividing $T_{2i}$ into a plurality of counting units in an interval from 0 to $T_x$; and if the value of $T_{2i}$ falls within a corresponding counting unit, a counting value of the counting unit being incremented by 1.

Preferably, performing numerical value distribution statistics on $T_{1i}$ to find a position where the signal light does not emit light within N periods comprises:

dividing $T_t/T_x$ counting units, wherein if the value of $T_{1i}$ is equal to No. of a counting unit, a counting result of the counting unit is incremented by 1; after performing numerical value statistics on all $T_{1i}$, finding out consecutive N counting units with the smallest counting value, then the positions of the N counting units are positions where a corresponding signal light does not emit light within N periods.

Preferably, N≥5 and N is a positive integer.

Preferably, the signal light is controlled to control the signal light not to emit light for the last N consecutive periods within each period $T_t$ of the synchronization light.

A device for synchronizing a high-speed quantum key generation system is disclosed, comprising:

a sender:

a control module, which controls a first light pulse of a signal light to align with a first light pulse of a synchronization light, and controls the signal light not to emit light in N consecutive periods within each period $T_t$ of the synchronization light, where N≥1 and N is a positive integer;

a receiver:

a measurement module, which takes a time each time the light pulse of the synchronization light is received as a starting time, performs time measurement on the received light pulse of the signal light, and stores all measurement results in $T_{di}$;

a calculation module, which is used for calculating $T_{di}/T_x$, wherein an integer for $T_{di}/T_x$ is denoted as $T_{1i}$, and a remainder for $T_{di}/T_x$ is denoted as $T_{2i}$;

a statistical module, which is used for performing time distribution statistics on $T_{2i}$, selecting a group of corresponding times with the most time-distribution as $T_4$, wherein it is configured to perform numerical value distribution statistics on $T_{1i}$, and find out a position where the signal light does not emit light within N periods to obtain an integer number $T_3$ of $T_x$ contained between the first light pulse of the signal light and the light pulse of the synchronization light;

a synchronization module, which is used for calculating a delay difference $T_0=T_3 \times T_x + T_4$, and realizing synchronization.

According to the above scheme, the application provides a method for synchronizing high-speed quantum key generation system, which comprises a sender: controlling a first light pulse of a signal light to align with a first light pulse of a synchronization light, and controlling the signal light not to emit light in N consecutive periods within each period $T_t$ of the synchronization light, where N≥1 and N is a positive integer; and a receiver: taking a time each time the light pulse of the synchronization light is received as a starting time, performing time measurement on the received light pulse of the signal light, and storing all measurement results in $T_{di}$; calculating $T_{di}/T_x$, wherein the integer for $T_{di}/T_x$ is denoted as $T_{1i}$, and the remainder for $T_{di}/T_x$ is denoted as $T_{2i}$; performing time distribution statistics on $T_{2i}$, and selecting a group of corresponding times with the most time-distribution as $T_4$; performing numerical value distribution statistics on $T_{1i}$, and finding out a position where the signal light does not emit light within N periods to obtain an integer number $T_3$ of $T_x$ contained between the first light pulse of the signal light and the light pulse of the synchronization light; and calculating a delay difference $T_0=T_3 \times T_x + T_4$ to realize synchronization.

Therefore, according to the method of the application, N consecutive non-emitting positions are removed from the signal light within each period $T_t$, and the rest corresponding positions emit light. The emitting positions can join the statistical processes on $T_{1i}$ and $T_{2i}$, and the statistical time is reduced by several orders of magnitude compared with the existing method that only a single signal light pulse is emitted so that the statistical process can be completed in hundreds of milliseconds or even shorter time. In addition, the statistical interval of the present application only needs $10^4$, that is, the buffer only needs 0.16 Mbit to meet the requirements. Therefore, the method of the application has the features of less hardware processor consumption and short statistical time, and can obviously improve the time consumption required in the system synchronization process and reduce the time required for establishing links of a communication system.

BRIEF DESCRIPTION OF THE DRAWINGS

In order to more clearly illustrate the technical solution of the present application, the drawings used in the embodiments will be briefly described below, and it would be obvious for a person skilled in the art to obtain other drawings according to these drawings without involving any inventive effort.

DESCRIPTION OF THE EMBODIMENTS

Figure 1:
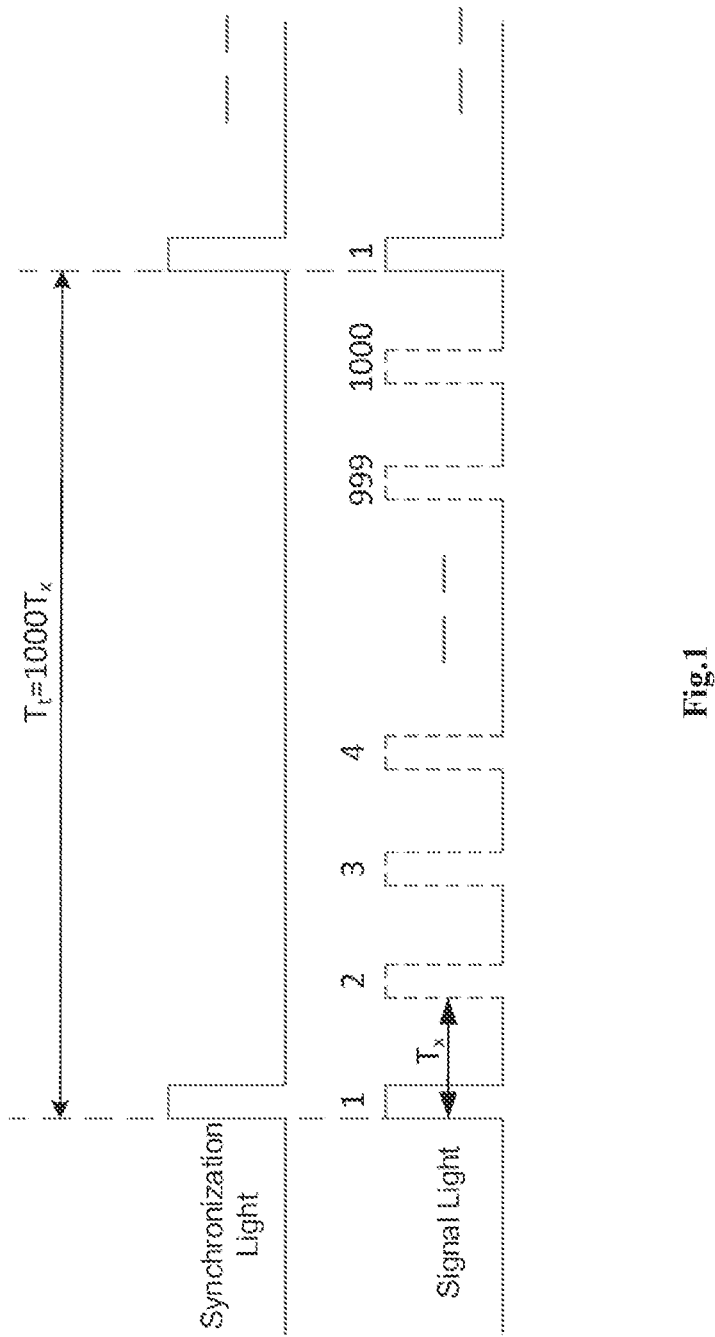
FIG. 1 is a light emitting schematic view of a synchronization light and a signal light emitted by a sender in an existing method.
Figure 2:
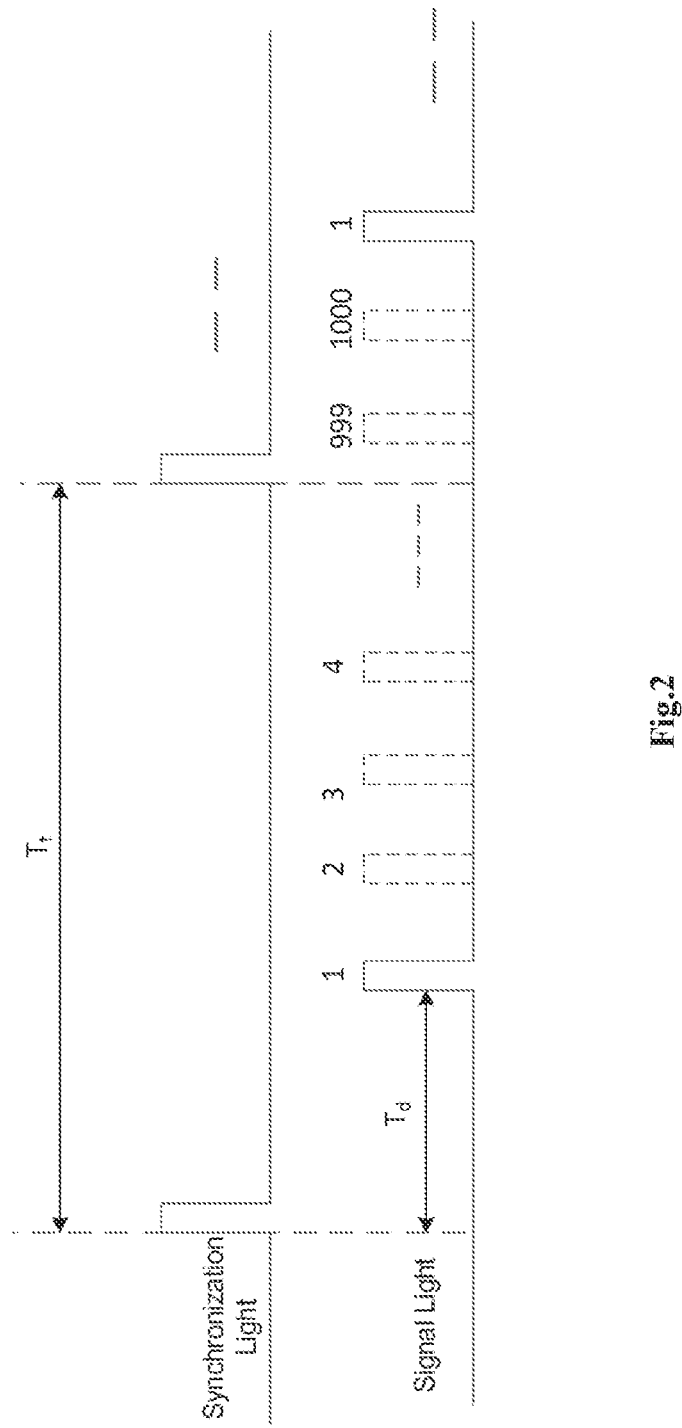
FIG. 2 is a schematic view of a time delay difference calculated by a receiver according to a received synchronization light and a received signal light in an existing method.
Figure 3:
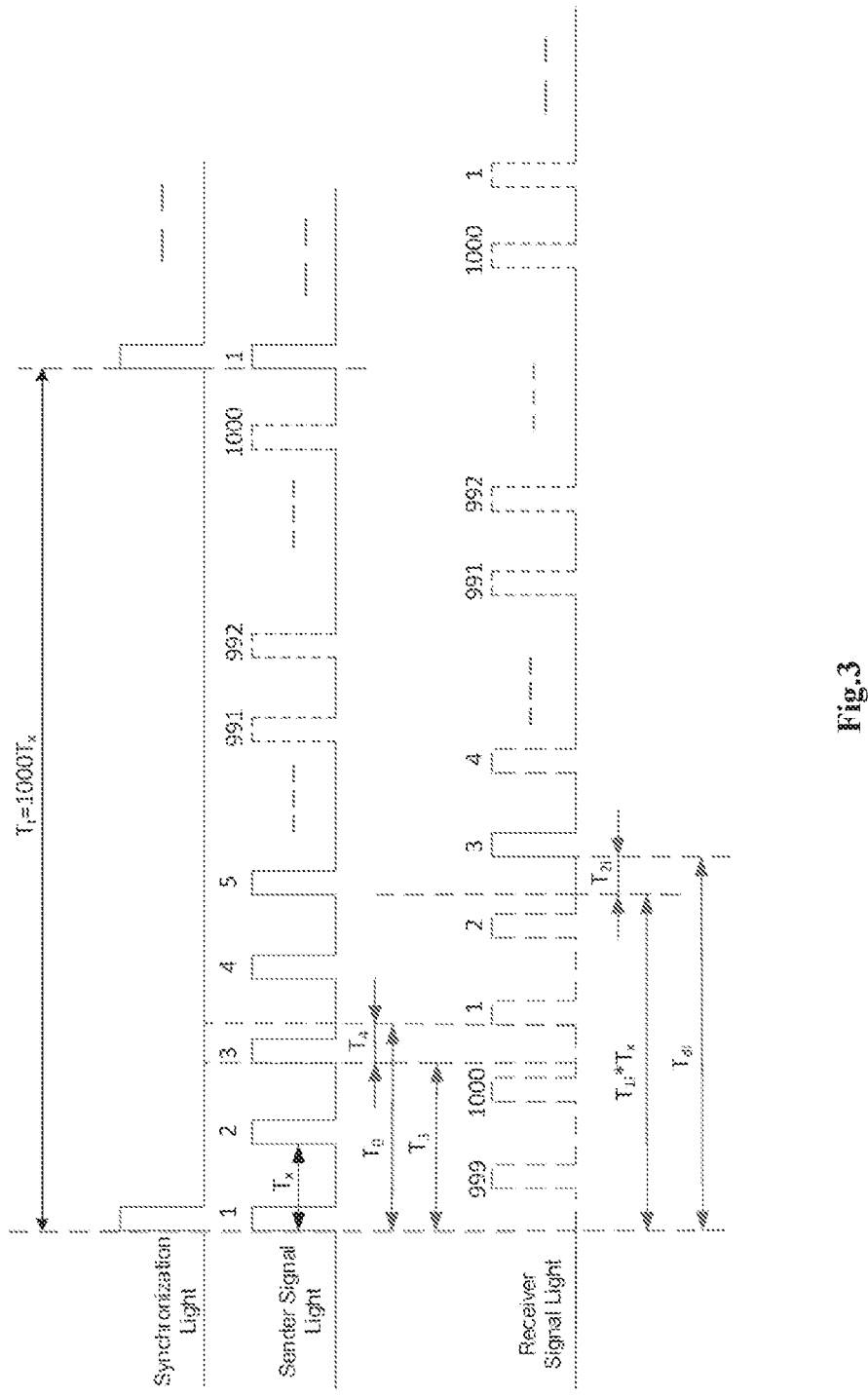
FIG. 3 is a schematic view of delay value calculation in a method of the present application.
Figure 4:
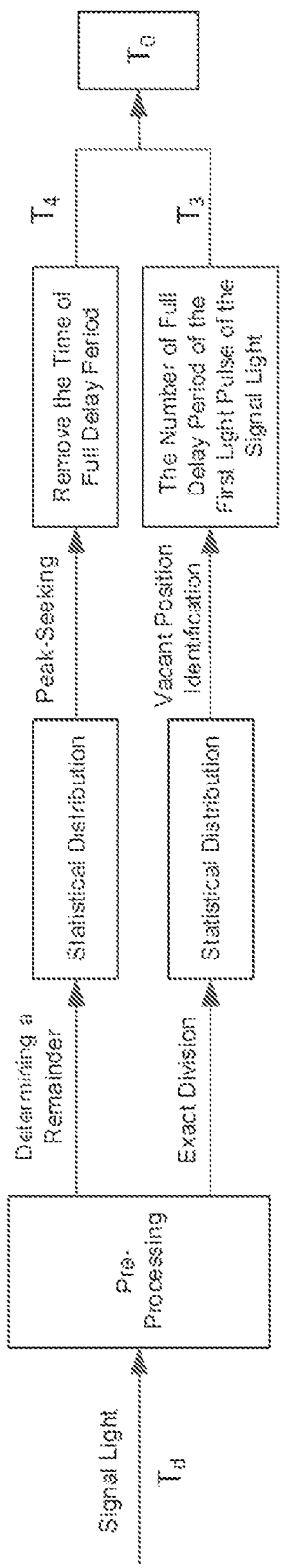
FIG. 4 is a flow block diagram of delay value calculation in a method of the present application.

To further clarify the above objects, features and advantages of the present application, a more particular description of the application will be rendered by reference to the appended drawings and specific embodiments thereof.

The embodiments of the application provides a method for synchronizing a high-speed quantum key generation system, which comprises: by a sender, controlling a first light pulse of a signal light to align with a first light pulse of a synchronization light, and controlling the signal light not to emit light in N consecutive periods within each period $T_t$ of the synchronization light, where N≥1 and N is a positive integer; and by a receiver, taking a time each time light pulses of the synchronization light are received as a starting time, performing time measurement on the received light pulse of the signal light, and storing all measurement results in $T_{di}$; calculating $T_{di}/T_x$, wherein the integer for $T_{di}/T_x$ is denoted as $T_{1i}$, and the remainder for $T_{di}/T_x$ is denoted as $T_{2i}$; performing time distribution statistics on $T_{2i}$, and selecting a group of corresponding times with the most time-distribution as $T_4$; performing numerical value distribution statistics on $T_{1i}$, and finding out the position where the signal light does not emit light within N periods to obtain the integer number $T_3$ of $T_x$ contained between the first light pulse of the signal light and the light pulse of the synchronization light; and calculating the delay difference $T_0=T_3 \times T_x+T_4$, and realizing synchronization.

Taking a time each time light pulses of the synchronization light are received as a starting time and performing time measurement on the received light pulse of the signal light means that each time the receiver receives the light pulses of the synchronization light, a time at which the light pulse of the synchronization light is received is a starting time for the measurement. For ease of understanding, the present application will be described by way of example. Assuming that the delay does not change, that the time at which the light pulse of the synchronization light is received by the receiver is the starting time, and that the time at which the first light pulse of the signal light is received is assumed to be 10 ns, the time at which the receiver receives the next synchronization light pulse is the starting time at which the signal light is measured in the next $T_t$, and then the time of the first light pulse of the signal light within the next $T_t$ is 10 ns.

In the quantum key generation system, during the transmission, the signal light is attenuated. If 1000 signal light pulses are contained within each $T_t$, the attenuation of the signal light in the system is usually more than 30 dB due to the signal light outlet light intensity in the quantum communication system being usually at a single photon level, and the attenuation of a transmission link, and the detection efficiency and the like. That is, only a single photon less than one thousandth is detected by the receiver, making the receiver on average receive one signal light pulse within each period $T_t$. Therefore, the probability of each signal light pulse received by the receiver within each $T_t$ is equal. Since the delay of the signal light within each period $T_t$ is almost equal, the remainder $T_{2i}$ is mostly around the remainder of the actual delay divisible period $T_x$. However, the delay difference $T_0$ in the present application is composed of an integer period time $T_3 \times T_x$ and a remainder $T_4$. Therefore the most preferable value can be selected by performing statistics on the measured $T_{2i}$, i.e. the remainder $T_4$ of the actual delay divisible period $T_x$. According to the application, the position where the signal light does not emit light (i.e. the vacant position) cannot be detected, so that when statistic on the integer $T_{1i}$ is performed s, $T_{1i}$ is basically an integer period excluding the vacant position. So the vacant position can be found by performing statistics on $T_{1i}$. Then according to the position of the vacant position in the signal light, the integer number $T_3$ of $T_x$ contained between the position of the first light pulse of the signal light and the light pulse of the synchronization light is found.

Compared with the existing scheme, the method of the application comprises receiving one light pulse of the signal light on average within each period $T_t$, so that one effective remainder value is obtained within each period $T_t$, and the statistical work can be completed only by 10000 $T_t$ when statistics on 10000 effective values are performed. As the general period $T_t$ of the synchronization light is mostly in the order of magnitude of 10 microseconds, the process generally only needs hundreds of milliseconds to obtain more than 10000 integer values and remainder values. Compared with the existing statistical error being controlled below 1% in 100 seconds, the statistical time of the application is reduced by nearly 3 orders of magnitude. In addition, the number of statistical intervals in the present application is $10^4$, i.e. the system needs to process $10^4$ of $T_t$ synchronization light pulse signals and signal light pulse signals, i.e. the buffer only needs 0.16 Mbit to meet the requirements, and the resource consumption of the hardware processor is low.

In addition, N consecutive non-emitting positions are removed from the signal light within each period $T_t$, and the rest corresponding positions emit light. The emitting positions can join the statistical processes on $T_{1i}$ and $T_{2i}$, and the statistical time is reduced by several orders of magnitude compared with the existing method that only a single signal light pulse is emitted so that the statistical process can be completed in hundreds of milliseconds or even shorter time. Therefore, the method of the application has the features of less hardware processor consumption and short statistical time, and can obviously improve the time consumption required in the system synchronization process and reduce the time required for establishing links of a communication system.

Performing time distribution statistics on $T_{2i}$ comprises dividing the $T_{2i}$ into a plurality of counting units in an interval from 0 to $T_x$; if the value of $T_{2i}$ falls within the corresponding counting unit, the counting value of the counting unit being incremented by 1. For ease of understanding the present application illustrates an example, for instance, a signal light pulse having a period $T_x$ of 10 ns may be divided into 200 counting units if the counting period of the selected detector is 50 ps. Each time when $T_{2i}$ has a value between 0 and 50 ps, the counting value of the first counting unit is incremented by 1, and each time $T_{2i}$ has a value between 51 and 100 ps, the counting value of the second counting unit is incremented by 1, and so on. And each time $T_{2i}$ has a value between 9051 and 10000 ps, the counting value of the 200th counting units is incremented by 1. Until all statistics on $T_{2i}$ are finished, a group with the largest counting value in the 200 counting units is found, wherein the time corresponding to the group is a value of $T_4$.

Performing numerical value distribution statistics on $T_{1i}$ to find out positions where signal light does not emit light within N periods, comprising dividing $T_t/T_x$ counting units, and the counting result of the counting unit is incremented by 1 if the numerical value of $T_{1i}$ is equal to No. of the counting units; after performing numerical values statistics on all $T_{1i}$ finding out consecutive N counting units with the smallest counting value. Then the positions of the N counting units are the corresponding positions where signal light does not emit light within N periods. For ease of understanding the present application illustrates an example, for instance, if the signal light within each $T_t$ contains 1000 light pulses, then 1000 counting units are divided, numbered from 0 to 999. Each time the value of $T_{1i}$ is 0, the counting value of the counting unit numbered 0 is incremented by 1, and each time the value of $T_{1i}$ is 1, the counting value of the counting unit numbered 1 is incremented by 1, and so on. Until all statistics on $T_{1i}$ are finished since there are N vacant positions, there must be N minimum counting values; the position where the N counting values are the smallest is the position where the signal light is vacant.

It should be noted that ideally in N vacant positions there should be no signal light reaching the receiver, i.e. the counting value for N positions should be 0. However, due to the dark counting of the detector and the like, the counting unit may also have a counting output at the N positions, i.e. the N positions also have a counting value, but the counting value at the N positions is very small. After the statistics are performed, at the N positions some positions may not have counting values, and some positions have counting values. The counting values, if any, are very small, usually 1-2, which are very different from the counting values for the positions which normally emit light, and therefore the identification of the vacant positions is not affected.

In a preferred scheme of the present application, N≥5 and N is a positive integer. The signal light is controlled not to emit light for N consecutive periods within each period $T_t$ of the synchronization light. A non-emitting position within one period $T_t$ may be anywhere, but it must be ensured that the vacancy positions are consecutive. In addition, the value of N is at least 1, but when the value of N is taken as 1, the counting values of some positions are too low due to the possible attenuation of the signal light or loss of detection efficiency of a detector, so that the deviation of the found vacant positions may be large. Therefore, it is preferable that the vacant position can be 5 or more, such as 5 or 10 or the like, such that the probability that there are more than a few extremely low statistical values consecutively due to the attenuation of the signal light or the loss of detection efficiency of the detector and the like is 0. So as long as there is a consecutively selected number of a vacant position, it can be regarded as a vacant position where the signal light lies in. Of course, the more vacant positions are, the easier they can be identified, but more vacant positions will increase the statistical time and consume too much processor resources; when the number of vacant positions is small, for example, 1 vacant position, the probability that there is 1 extremely low statistical value in a normally emitting position due to the attenuation of the signal light or the loss of detection efficiency of the detector and the like is relatively large, and therefore when the number of vacant positions is small, the error rate can be caused to increase.

In a preferred scheme of the present application, the signal light is controlled to control the signal light not to emit light for the last N consecutive periods within each period $T_t$ of the synchronization light. Therefore, when the vacant position is found, the first position after the vacant position is the position of the first light pulse of the signal light, and the number $T_3$ of the integer number of signal light periods $T_x$ corresponding to the position of the first light pulse of the signal light is equal to the number of the first position after the vacant position. For example, the first position after the vacant position in the second detector is numbered as 500, then $T_3=500$, then $T_0=500 \times T_x + T_4$.

In summary, according to the method for synchronizing high-speed quantum key generation system, if the signal light within each $T_t$ contains 1000 light pulses, the rest positions can join the statistical processes on $T_{1i}$ and $T_{2i}$, because the signal light removes vacant positions, so that the required statistical time is shortened by nearly 3 orders of magnitude compared with the conventional single-pulse method. Therefore, the method of the application can obviously improve the consumption time required in the system synchronous correction process, shorten the calibration time required in the system light path switching process, improve the system performance and greatly improve the user experience.

The invention also provides a device for synchronizing high-speed quantum key generation system, which comprises a sender: a control module, which is used for controlling the first light pulse of the signal light to be aligned with the first light pulse of the synchronization light, and controlling the signal light not to emit light in N consecutive periods within each period $T_t$ of the synchronization light, where N≥1 and N is a positive integer; and a recipient: a measurement module which is used for taking the time each time light pulses of the synchronization light is received as starting time, performing time measurement on the received light pulse of the signal light, and storing all measurement results in $T_{di}$; a calculation module, which is used for calculating $T_{di}/T_x$, wherein the integer for $T_{di}/T_x$ is denoted as $T_{1i}$, and the remainder for $T_{di}/T_x$ is denoted as $T_{2i}$; a statistical module, which is used for performing time distribution statistics on $T_{2i}$, and selecting a group of corresponding times with the most time-distribution as $T_4$, performing numerical value distribution statistics on $T_{1i}$, and finding out the position where the signal light does not emit light within N periods to obtain the integer number $T_3$ of $T_x$ contained between the first light pulse of the signal light and the light pulse of the synchronization light; a synchronization module, which is used for calculating the delay difference $T_0=T_3 \times T_x + T_4$, and realizing synchronization.

The present application has been described in detail above with reference to specific embodiments and illustrative examples, but the description is not to be construed as limiting the present application. It will be understood by those skilled in the art that various equivalents, modifications, or improvements may be made to the technical solutions and embodiments thereof of the present application without departing from the spirit and scope of the present application, and the various equivalents, modifications, or improvements fall within the scope of the present application. It is intended that the scope of the application is defined by the claims appended hereto.

What is claimed is:

1. A method for synchronizing a high-speed quantum key generation system, characterized in that said method comprises:

controlling, by a sender, a first light pulse of a signal light to align with a first light pulse of a synchronization light, and controlling the signal light not to emit light in N consecutive periods within each period $T_t$ of the synchronization light, where N≥1 and N is a positive integer;

taking, by a receiver, a time each time the light pulse of the synchronization light is received as a starting time, performing time measurement on the received light pulse of the signal light, and storing all measurement results in $T_{di}$;

calculating $T_{di}/T_x$ by the receiver, wherein an integer for $T_{di}/T_x$ is denoted as $T_{1i}$, and a remainder for $T_{di}/T_x$ is denoted as $T_{2i}$;

performing, by the receiver, time distribution statistics on $T_{2i}$, and selecting a group of corresponding time with the most time-distribution as $T_4$;

performing, by the receiver, numerical value distribution statistics on $T_{1i}$, and finding out a position where the signal light does not emit light within N consecutive periods to obtain an integer number $T_3$ of $T_x$ contained between the first light pulse of the signal light and the light pulse of the synchronization light; and by the receiver, calculating a delay difference $T_0=T_3 \times T_x + T_4$, and realizing synchronization.

2. The method for synchronizing the high-speed quantum key generation system according to claim 1, characterized in that performing time distribution statistics on $T_{2i}$ comprises:

dividing into a plurality of counting units in an interval from 0 to $T_x$; and if the value of $T_{2i}$ falls within a corresponding counting unit, a counting value of the counting unit being incremented by 1.

3. The method for synchronizing the high-speed quantum key generation system according to claim 1, characterized in that performing numerical value distribution statistics on $T_{1i}$ to find the position where the signal light does not emit light within N consecutive periods comprises:

dividing $T_t/T_x$ counting units, wherein if the value of $T_{1i}$ is equal to a number of a counting unit, a counting result of the counting unit is incremented by 1; after performing numerical value statistics on all $T_{1i}$, finding out consecutive N counting units with the smallest counting value, then the positions of the N counting units are positions where a corresponding signal light does not emit light in N periods.

4. The method for synchronizing the high-speed quantum key generation system according to claim 1, characterized in that N≥5 and N is a positive integer.

5. The method for synchronizing the high-speed quantum key generation system according to claim 1, characterized in that the signal light is controlled to control the signal light not to emit light for the last N consecutive periods within each period $T_t$ of the synchronization light.

* * * * *